United States Patent
Kim et al.

(10) Patent No.: US 6,603,526 B2
(45) Date of Patent: Aug. 5, 2003

(54) LIQUID CRYSTAL DISPLAY HAVING HIGH TRANSMITTANCE AND HIGH APERTURE RATIO IN WHICH ELECTRODES HAVING BRANCHES ARRANGED SYMMETRY TOGETHER IN ADJACENT SUB-PIXEL REGIONS

(75) Inventors: Hyang Yul Kim, Kyoungki-do (KR); Seung Hee Lee, Kyoungki-do (KR)

(73) Assignee: Boe-Hydis Technology Co., Ltd., Kyoungki-do (KR)

( * ) Notice: Subject to any disclaimer, the term of this patent is extended or adjusted under 35 U.S.C. 154(b) by 0 days.

(21) Appl. No.: 10/213,873

(22) Filed: Aug. 6, 2002

(65) Prior Publication Data

US 2002/0191139 A1 Dec. 19, 2002

Related U.S. Application Data

(62) Division of application No. 09/320,085, filed on May 26, 1999, now Pat. No. 6,456,351.

(30) Foreign Application Priority Data

May 29, 1998 (KR) ............................................. 98-19606

(51) Int. Cl.[7] ............................................. G02F 1/1343
(52) U.S. Cl. ........................ 349/141; 349/142; 349/146
(58) Field of Search ................................. 349/141, 142, 349/144, 146

(56) References Cited

U.S. PATENT DOCUMENTS

| | | | | |
|---|---|---|---|---|
| 5,886,762 A | * | 3/1999 | Lee et al. | .................... 349/141 |
| 6,088,078 A | * | 7/2000 | Kim et al. | .................... 349/141 |
| 6,100,955 A | * | 8/2000 | Yanagawa et al. | .......... 349/141 |
| 6,256,081 B1 | * | 7/2001 | Lee et al. | .................... 349/141 |
| 6,456,351 B1 | * | 9/2002 | Kim et al. | .................... 349/141 |

* cited by examiner

Primary Examiner—Toan Ton
Assistant Examiner—Mike Qi
(74) Attorney, Agent, or Firm—Ladas & Parry

(57) ABSTRACT

The present invention is directed to provide a liquid crystal display having an improved picture quality, high transmittance and high aperture ratio.

The liquid crystal display comprises: an upper and a lower substrate opposed each other to be spaced apart; a liquid crystal layer interposed between inner surfaces of the upper and lower substrates, the liquid crystal layer including a plurality of liquid crystal molecules; a gate bus line and a data bus line formed in the lower substrate in a matrix configuration and defining sub-pixel regions; a counter electrode formed on each sub-pixel region of the lower substrate; a pixel electrode formed on each sub-pixel region of the lower substrate, wherein the counter electrode and the pixel electrode form an electric field; a thin film transistor formed at an intersection of the gate bus line and the data bus line, and switching a signal transmitted from the data bus line into the pixel electrode when the gate bus line is selected; and a homogeneous alignment layer formed on inner surfaces of the upper and lower substrates, wherein a first electric field is formed between the counter and pixel electrodes of a selected sub-pixel among the sub-pixel regions, and the electric field is formed as a diagonal line with respect to the gate bus line and the data bus line, wherein a second electric field is formed between the counter electrode and the pixel electrode of another sub-pixel adjacent to said selected sub-pixel, and the second electric field is formed as a diagonal line to make a symmetry with the first electric field.

5 Claims, 6 Drawing Sheets

LIQUID CRYSTAL DISPLAY HAVING HIGH TRANSMITTANCE AND HIGH APERTURE RATIO IN WHICH ELECTRODES HAVING BRANCHES ARRANGED SYMMETRY TOGETHER IN ADJACENT SUB-PIXEL REGIONS

This application is a division of U.S. Ser. No. 09/320,085 filed May 26, 1999, now U.S. Pat. No. 6,456,351, which U.S. application is hereby incorporated herein by reference.

FIELD OF THE INVENTION

The present invention relates to a liquid crystal display, more particularly to a liquid crystal display having an improved picture quality.

BACKGROUND OF THE INVENTION

The In-Plane Switching (hereinafter IPS) mode liquid crystal display has been suggested to complement the viewing angle characteristic of Twisted Nematic (hereinafter TN) mode liquid crystal display. (Principle and Characteristic of Electro-optical behavior with in-plane switching mode, Asia Display 1995, p. 577–580)

The IPS mode liquid crystal display is illustrated in FIG. 1. Electrodes $2a$, $2b$ for driving a liquid crystal molecule $3a$ are disposed on a lower substrate 1. At that time, a distance between the electrodes $2a$, $2b$ is larger than a distance between the lower substrate 1 and an upper substrate (not shown) thereby forming an electric field parallel to a surface of the lower substrate 1. Herein, the electrodes $2a$, $2b$ are made of opaque material, such as Mow and Al. A reference symbol "R" stands for a rubbing direction of an alignment layer.

As known in the art, the refractive anisotropy (or birefringence, $\Delta n$) is occurred due to the difference of the lengths of the long and the short axes. The refractive anisotropy $\Delta n$ is also varied from the viewer's viewing directions. Therefore a predetermined color is appeared on the region where the polar angle is of 0 degree and the azimuth angle range of degrees 0, 90, 180 and 270 in spite of the white state. This phenomenon is regarded as color shift and more detailed description thereof is attached with reference to the equation 1.

$$T \approx T_0 \sin^2(2\chi) \cdot \sin^2(\pi \cdot \Delta n d/\lambda) \quad \text{equation 1}$$

wherein,

T: transmittance;

$T_0$: transmittance to the reference light;

$\chi$: angle between an optical axis of liquid crystal molecule and a polarizing axis of the polarizing plate;

$\Delta n$: birefringence;

d: distance or gap between the upper and lower substrates (thickness of the liquid crystal layer); and $\lambda$: wavelength of the incident light.

So as to obtain the maximum transmittance T, the $\chi$ should be $\pi/4$ or the $\Delta nd/\lambda$ should be $\pi/2$ according to the equation 1. As the $\Delta nd$ varies with the birefringence difference of the liquid crystal molecules from viewing directions, the value of $\lambda$ is varied in order to satisfy $\pi/2$. According to this condition, the color corresponding to the varied wavelength $\lambda$ appears.

Accordingly, as the value of $\Delta n$ relatively decreases at viewing direction "$\alpha$" toward the short axes of the liquid crystal molecules, the wavelength of the incident light for obtaining the maximum transmittance relatively decreases also. Consequently a color of blue having a shorter wavelength than that of a color of white appears.

On the other hand, as the value of $\Delta n$ relatively increases at a viewing direction "$\beta$" toward the short axes of the liquid crystal molecules, the wavelength of an incident light relatively increases also.

Consequently a color of yellow having a longer wavelength than that of the color of white appears.

Deterioration is caused in the picture quality of IPS mode liquid crystal display.

Furthermore, since the electrodes $2a$, $2b$ are made of opaque material, the aperture area in the IPS mode liquid crystal display is reduced and the transmittance thereof is also degraded. As a result, so as to obtain a proper brightness, an intensified backlight is required which incurs too much power consumption.

So as to solve the foregoing problems, a method to form the electrodes $2a$, $2b$ with a transparent material has been proposed. In such a liquid crystal liquid display, the aperture ratio is often increased, however the transmittance is often not improved. That is to say, to produce an in-plane electric field, a distance l between the electrodes $2a$, $2b$ must be set to be greater than a distance between upper and lower substrates. To obtain a suitable intensity of the electric field, the electrodes $2a$ and $2b$ have relatively large dimension of width, for example, 10 to 20 $\mu$m.

However, if the electrodes have such a large dimension of width, the liquid crystal molecules positioned right above the upper surfaces of the electrodes 12 and 14 do not move thereby forming equipotential lines. As the result, since the liquid crystal molecules positioned right above the upper surfaces of the electrodes continue to hold an initial configuration even in the presence of the electric field, the transmittance is little increased.

SUMMARY OF THE INVENTION

The present invention is directed to provide a liquid crystal display having an improved picture quality.

Further, the present invention is directed to improve transmittance and aperture ratio of the liquid crystal display.

So as to accomplish foregoing objects of this invention, the liquid crystal display having high transmittance and high aperture ratio comprising:

an upper and a lower substrate opposed each other to be spaced apart;

a liquid crystal layer interposed between inner surfaces of the upper and lower substrates, the liquid crystal layer including a plurality of liquid crystal molecules;

a gate bus line and a data bus line formed in the lower substrate in a matrix configuration and defining sub-pixel regions;

a counter electrode formed on each sub-pixel region of the lower substrate;

a pixel electrode formed on each sub-pixel region of the lower substrate, wherein the counter electrode and the pixel electrode form an electric field;

a thin film transistor formed at an intersection of the gate bus line and the data bus line, and switching a signal transmitted from the data bus line into the pixel electrode when the gate bus line is selected; and a homogeneous alignment layer formed on inner surfaces of the upper and lower substrates, wherein a first electric field is formed between the counter and pixel electrodes of a selected sub-pixel among the sub-pixel regions, and the electric field is formed as a diagonal line with respect to the gate bus line and the data bus line, wherein a second electric field is formed between the counter electrode and the pixel electrode of another sub-pixel adjacent to said selected sub-pixel, and the second electric field is formed as a diagonal line to make a symmetry with the first electric field.

The liquid crystal display further comprises:

an upper and a lower substrate opposed to be spaced apart;

a liquid crystal layer interposed between inner surfaces of the upper and lower substrates, the liquid crystal layer including a plurality of liquid crystal molecules;

a gate bus line and a data bus line formed in the lower substrate in a matrix configuration and defining sub-pixel regions;

a counter electrode including a body of a rectangular frame shape formed at each sub-pixel region and at least a diagonal branch dividing a region surrounded by the body;

a pixel electrode including a first electrode which is formed to be overlapped with a selected portion of the body of the counter electrode, and second electrodes being extended from the first electrode and disposed parallel to diagonal branches being formed at their corresponding sub-pixels;

a thin film transistor formed at an intersection of the gate bus line and the data bus line, and switching a signal transmitted from the data bus line into the pixel electrode when the gate bus line is selected; and a homogeneous alignment layer formed on inner surfaces of the upper and lower substrates, wherein the diagonal branches and the second electrodes at a selected sub-pixel region are extended as diagonal lines with respect to the gate bus line and the data bus line, wherein other diagonal branches and second electrodes at other sub-pixel regions adjoining in all directions to said selected sub-pixel region are arranged to make a symmetry together with the diagonal branches and the second electrodes of the selected sub-pixel region, wherein the counter and pixel electrodes are made of a transparent conductor, and widths of the diagonal branches of the counter electrode and the second electrodes of the pixel electrodes are properly set so that the electric field being generated between the counter and pixel electrodes may affect the electrodes entirely.

The liquid crystal display still comprises:

an upper and a lower substrate opposed to be spaced apart;

a liquid crystal layer interposed between inner surfaces of the upper and lower substrates, the liquid crystal layer including a plurality of liquid crystal molecules;

a gate bus line and a data bus line formed in the lower substrate in a matrix configuration and defining sub-pixel regions;

a counter electrode of a rectangular plate shape formed at a sub-pixel region;

a pixel electrode including a first electrode formed to be overlapped with a selected portion of the counter electrode, and a second electrode being extended from the first electrode in the form of a diagonal line;

a thin film transistor formed at an intersection of the gate bus line and the data bus line, and switching a signal transmitted from the data bus line into the pixel electrode when the gate bus line is selected; and a homogeneous alignment layer formed on inner surfaces of the upper and lower substrates, wherein the second electrode within a selected sub-pixel region extended as a diagonal line of the gate bus line and the data bus line, wherein the second electrode within other sub-pixel regions adjoining in all directions to the selected sub-pixel region is arranged to make a symmetry with the selected sub-pixel region, wherein the counter and pixel electrodes are made of a transparent conductor.

BRIEF DESCRIPTION OF THE INVENTION

DETAILED DESCRIPTION OF THE PREFERRED EMBODIMENTS

Hereinafter, detailed description of the preferred embodiments will be followed.

[First Embodiment]

Figure 1:
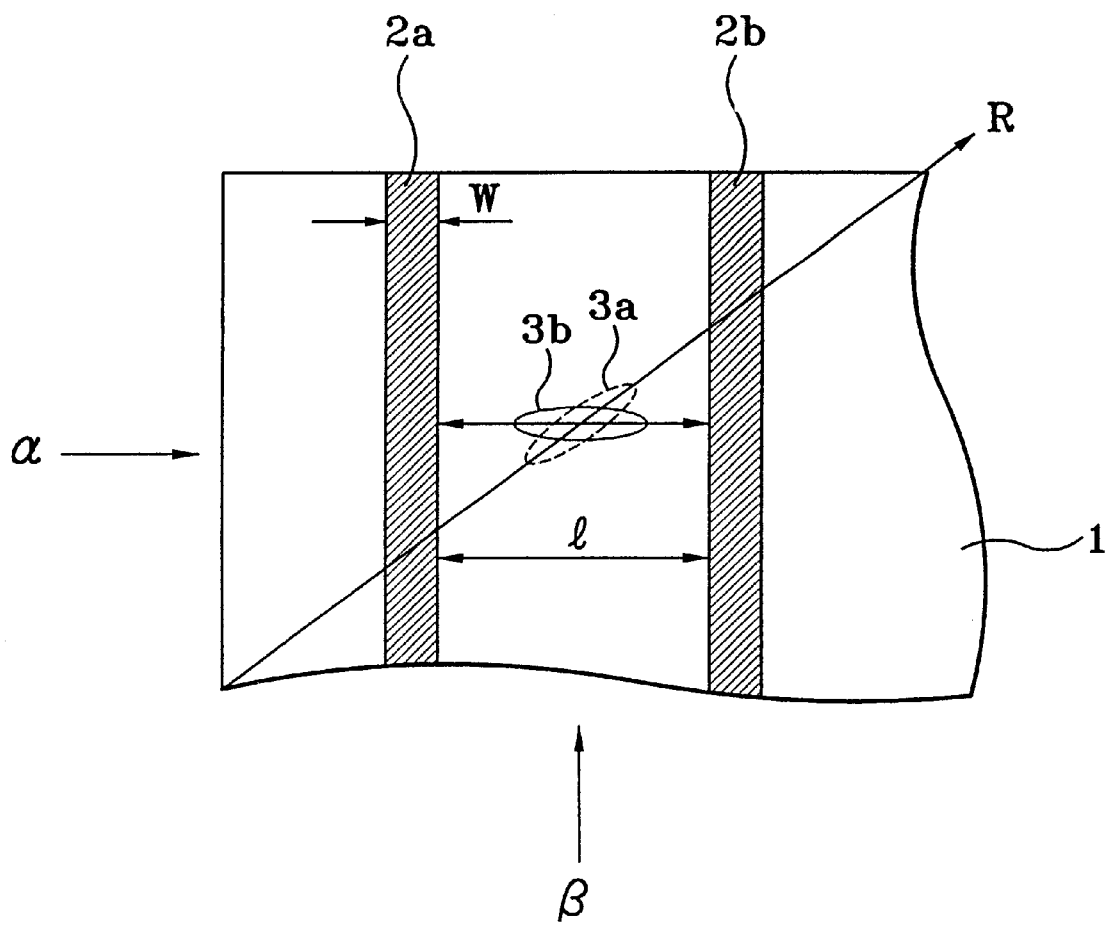
FIG. 1 illustrates a principle of driving a conventional IPS-mode liquid crystal display.
Figure 2A:
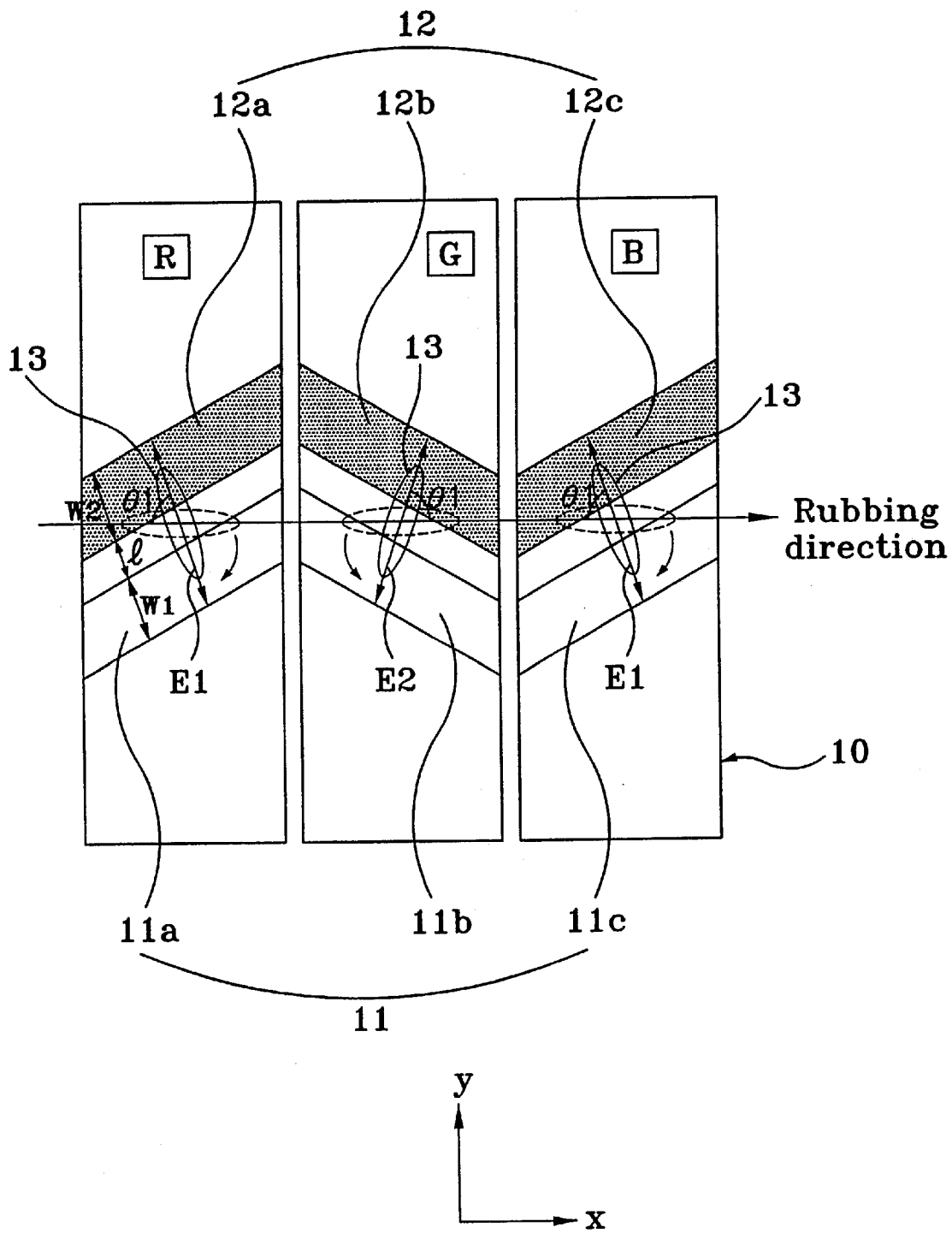
FIG. 2A is a plan view of a liquid crystal display according to a first embodiment of the present invention where a material of positive dielectric anisotropy is used for liquid crystal.
Figure 2B:
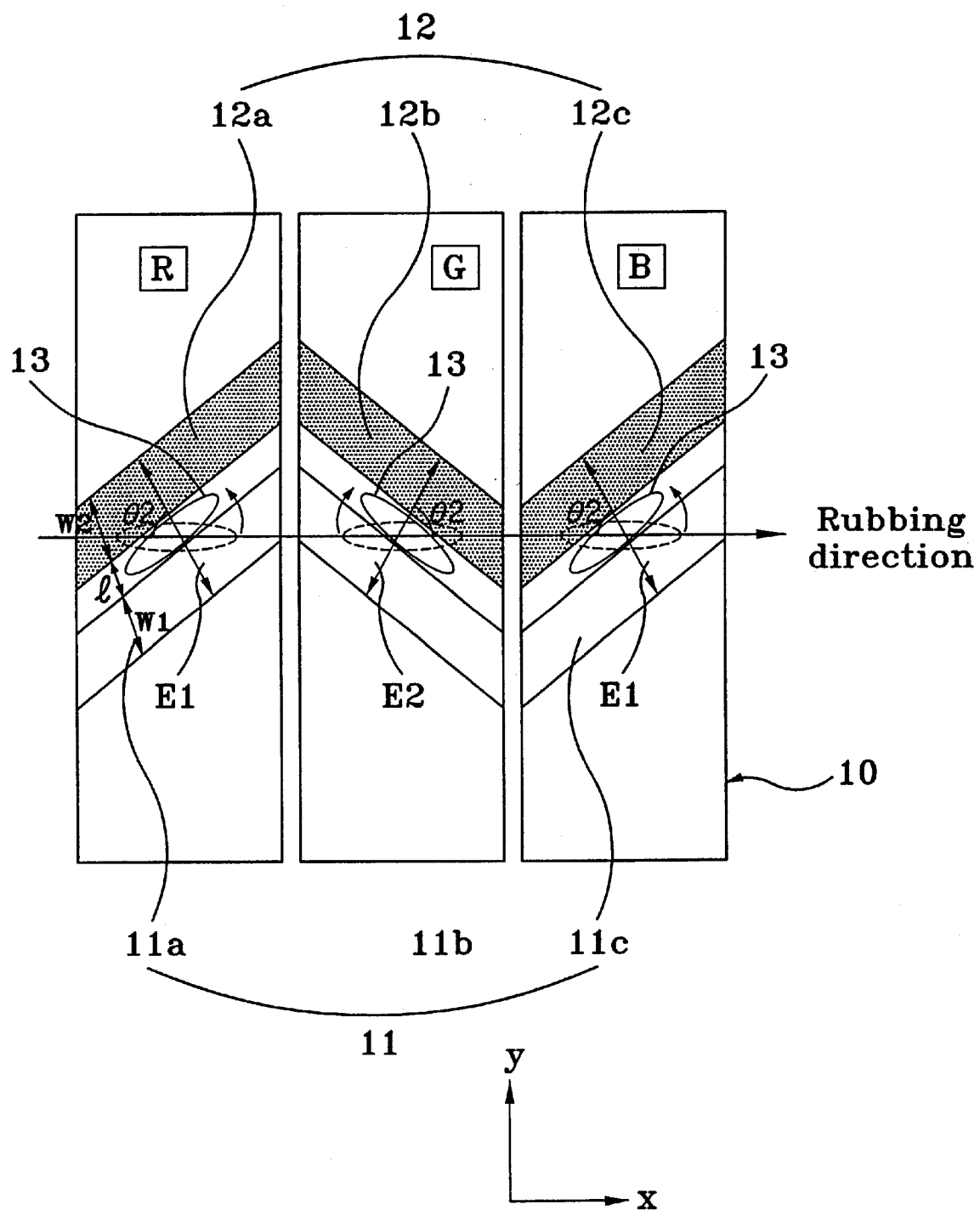
FIG. 2B is a plan view of a liquid crystal display according to a second embodiment of the present invention where a material of negative dielectric anisotropy is used for liquid crystal.

FIG. 2A shows a liquid crystal display according to a first embodiment of the present invention where a material of positive dielectric anisotropy is used for liquid crystal, and FIG. 2B shows a liquid crystal display according to a second embodiment of the present invention where a material of negative dielectric anisotropy is used for liquid crystal.

Referring to FIG. 2A, sub-pixels of red R, green G, blue B are defined in a lower glass substrate 10. First electrodes 11a, 11b, 11c for driving liquid crystal are formed in the respective sub-pixel regions R,G,B. Herein, the first electrode 11 in the respective sub-pixels R,G,B is formed in a shape of diagonal line. The first electrodes 11a, 11c in the sub-pixels of red R and blue B, are arranged in the same direction, and the first electrode 11b within the sub-pixel of green G is disposed to make a symmetry with the first electrodes 11a, 11c of the sub-pixels R,B. The respective first electrodes 11a, 11b, 11c are made of a transparent conductive film and have a selected width w1.

The second electrode 12 is also formed within the respective sub-pixels R,G,B. The second electrodes 12a, 12b, 12c are arranged in parallel to be spaced apart from the first electrodes 11a, 11b, 11c in their corresponding sub-pixels R,G,B by a selected distance. The second electrode 12 is also made of a transparent material and the second electrode 12 have a selected width w2. Herein, a distance l between the first electrodes 11a, 11b, 11c and the second electrodes 12a, 12b, 12c is smaller than widths w1,w2 of the first and second electrodes 11,12 and is also smaller than the distance between the upper and lower substrates. Furthermore, the widths w1,w2 of the first electrodes 11a, 11b, 11c and the second electrodes 12a, 12b, 12c are set such that the electric field being formed between the first and second electrodes make the liquid crystal molecules overlying the upper regions of both electrodes 11,12 drive sufficiently.

A homogeneous alignment layer (not shown) for determining an initial alignment direction of the liquid crystal molecules 13 is formed on the lower glass substrate 10 where the first and second electrodes 11,12 are formed. The alignment layer is rubbed in the x direction (or in the y direction) so that the long axes of the liquid crystal molecules 13 are arranged in the x direction (or in the y direction) in the absence of electric field.

If there is a voltage difference between the first electrode 11 and the second electrode 12 being arranged as above, electric fields E1,E2 are formed. At this time, the electric fields E1,E2 are arranged in a shape of diagonal lines. Further, the electric field E1 formed in the sub-pixels of red and blue, makes a symmetry with the electric field E2 formed in the sub-pixel of green.

Type of liquid crystal is determined depending on the angle θ between the electric fields E1,E2 and a rubbing axis. That means, when the angle θ is set in the range of 45~90°, a liquid crystal of positive dielectric anisotropy is used and, when the angle θ is set in the range of 0~45°, a liquid crystal of negative dielectric anisotropy is used.

Selecting of dielectric anisotropy of liquid crystal molecules depending on the angle between the electric field and the rubbing axis is required to obtain the maximum transmittance.

For example, as shown in FIG. 2A, the long axes of the liquid crystal molecules 13 are arranged parallel to the electric fields E1,E2 when the angle θ1 is set in the range of 45~90° since the liquid crystal of positive dielectric anisotropy is used. And then, the liquid crystal molecules 13 is twisted by 45° or more thereby obtaining the maximum transmittance.

Furthermore, as shown in FIG. 2B, the short axes of the liquid crystal molecules 13 are arranged parallel to the electric fields E1,E2 when the angle θ2 is set in the range of 0~45° since the liquid crystal of negative dielectric anisotropy is used. Herein, the liquid crystal molecules 13 is also twisted by 45° or more thereby obtaining the maximum transmittance.

As shown in FIGS. 2A,2B, under the presence of electric field, the liquid crystal molecules 13 in the sub-pixels R,B are aligned in a clockwise direction (a counter-clockwise direction in FIG. 2B), and the liquid crystal molecules 13 in the sub-pixel of G are aligned in a counter-clockwise direction (a clockwise direction in FIG. 2B). Herein, since human eyes do not recognize sub-pixels, it is seem that the liquid crystal molecules are divided in two directions, in aspect of main pixels. Therefore, the refractive anisotropy of the liquid crystal molecules 13 is compensated and color shift is prevented.

Furthermore, the electric fields affect the liquid crystal molecules overlying the upper portions of the electrodes sufficiently, and the liquid crystal molecules are all driven thereby improving the transmittance and aperture ratio.

[Second Embodiment]

Figure 3:
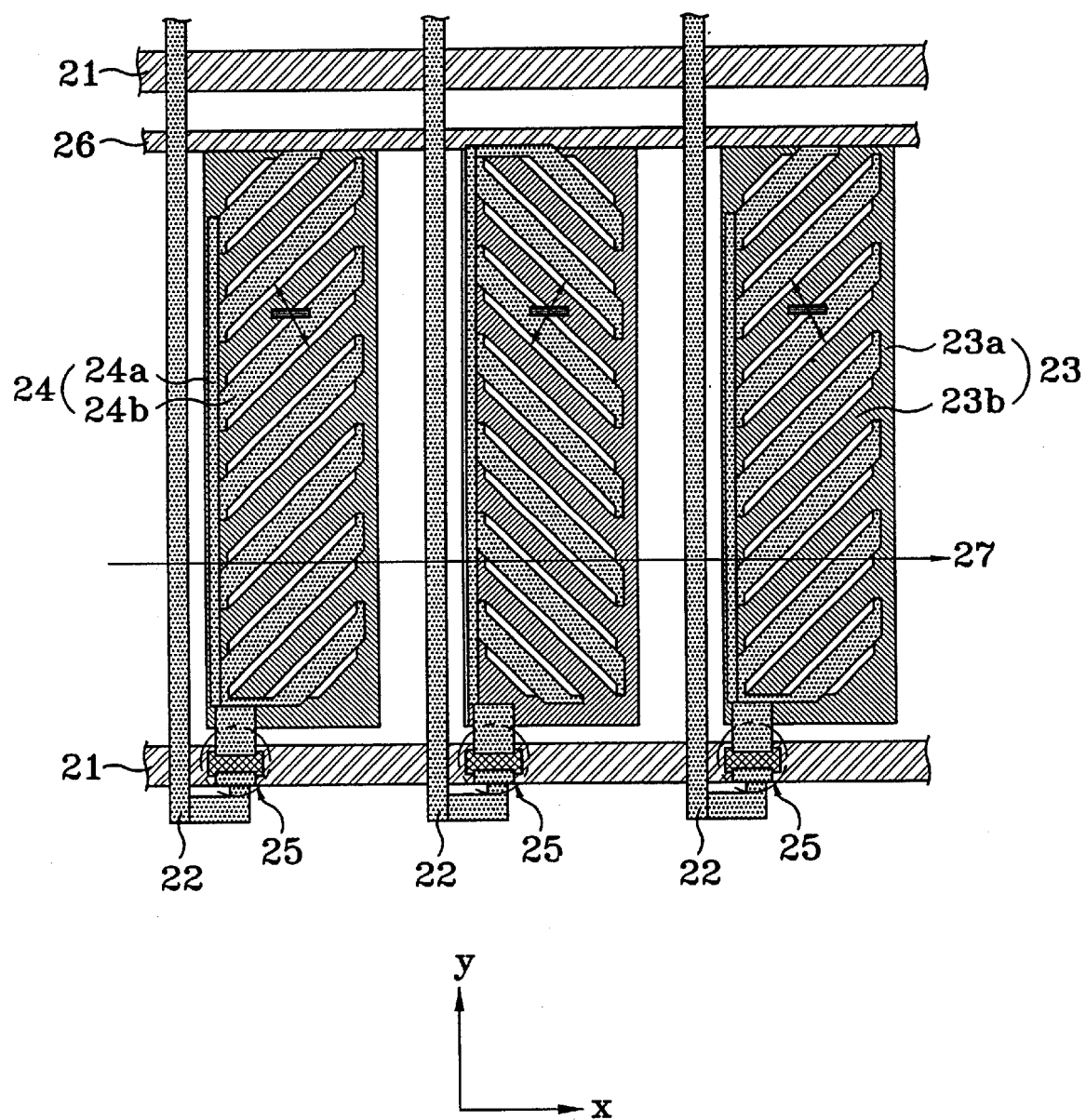
FIG. 3 is a plan view of a lower substrate in the liquid crystal display according to the second embodiment of the present invention.

FIG. 3 is a plan view of a lower substrate in an active matrix type liquid crystal display according to the second embodiment of the present invention.

Referring to FIG. 3, in a lower glass substrate 20, a plurality of gate bus lines 21 are arranged in an x direction and a plurality of data bus lines 22 are arranged in a y direction which is substantially perpendicular to the x direction thereby defining sub-pixels R,G,B. Herein, only a pair of gate bus lines 21 and a pair of data bus lines 22 for showing a main pixel region consisting of three sub-pixels R,G,B are illustrated in the drawing.

Herein, the first sub-pixel is called a sub-pixel of red R, the second sub-pixel is called a sub-pixel of green G and the third sub-pixel is called a sub-pixel of Blue B.

A gate insulating layer (not shown) is interposed between the gate bus lines 21 and the data bus lines 22 thereby insulating therebetween. The gate bus lines 21 and the data bus lines 22 are made of an opaque material of high conductivity, such as MoW, Al, Ta and Ti.

Figure 4:
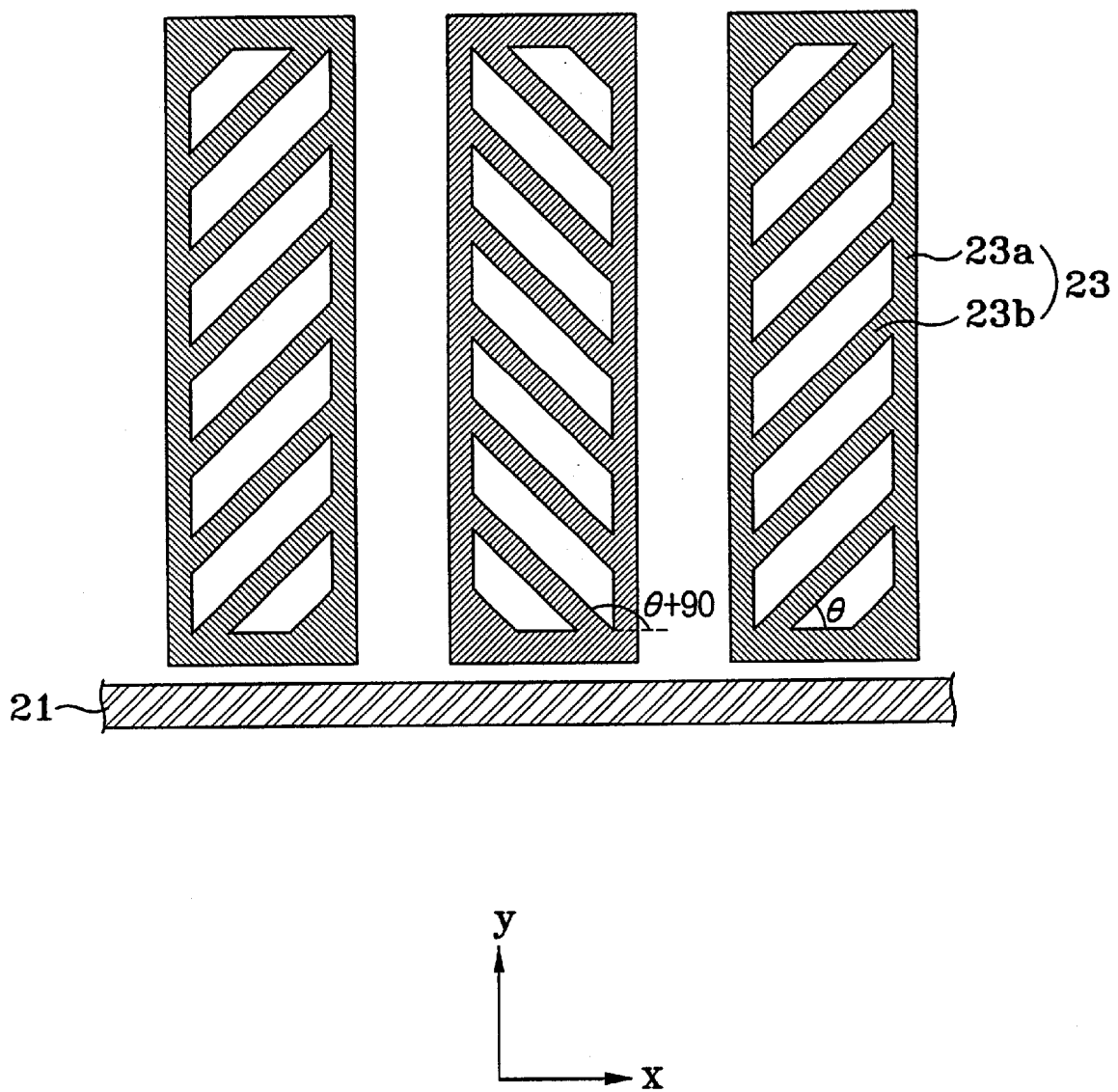
FIG. 4 is a plan view of a counter electrode in the liquid crystal display according to the second embodiment of the present invention.

A counter electrode 23 is formed at each sub-pixel and spaced apart from the gate bus lines 21 and the data bus lines 22. As shown in FIG. 4, the counter electrode 23 includes body 23a having a rectangular frame shape entirely and diagonal branches 23b dividing a region surrounded by the body 23a into a number of spaces. Herein, although extending directions of the diagonal branches 23b are different from the respective sub-pixel regions R,G,B, however the diagonal branches 23b within the same sub-pixel are arranged all in parallel. Preferably, the extending direction of diagonal branches 23b in the same sub-pixel makes a symmetry with the extending direction of diagonal branches in another sub-pixel being disposed adjacent to the former. As shown in the drawing, for example the diagonal branches 23b in the sub-pixels of red R and in the sub-pixels of blue B have an angle θ with an x direction and the diagonal branches 23b in the sub-pixel of green G have an angle θ+90° with the x direction. The diagonal branches 23b of the counter electrodes 23 are disposed with a regular distance and their widths are set in the range of approximately 2~4 μm.

A pixel electrode 24 is overlapped on the counter electrode 23. The pixel electrode 24 includes a first electrode 24a being overlapped with a selected portion of the body 23a of the counter electrode 23 and a diagonal second electrode 24b being extended from the first electrode 24a so as to be disposed between the diagonal branches 23b of the counter electrode 23b. Herein, the second electrode 24b is disposed parallel to the diagonal branch 23b in its corresponding sub-pixel.

At this time, the first electrode 24a of the pixel electrode is in contact with all second electrodes being formed in the same sub-pixel. Therefore, the first electrode 24a is formed in "⌊" figure in the sub-pixels R,B and is formed in "⌈" figure in the sub-pixel G. Herein, a width of the first electrode 24a of the pixel electrode 24 is identical to or smaller than that of the body 23a of the counter electrode 23 and a width of the second electrode 24b of the pixel electrode 24 is preferably identical to that of the diagonal branches 23b of the counter electrode 23. In addition, the distance between the diagonal branch 23b and the second electrode 24b is set in the range of approximately 0.5~3 μm, and preferably 1 μm in the present embodiment. Further, the distance between the diagonal branch 23b and the second electrode 24b is set such that the distance is smaller than their respective widths.

End portions of the second electrode 24b of the pixel electrode 24 is bent to an obtuse-angled portion among the portion made by crossing the second electrode 24b of the pixel electrode 24 and the body 23a of the counter electrode 23. This is because to remove edge electric field generation at corner regions.

Herein, both counter electrode 23 and pixel electrode 24 are preferably made of a transparent conductive film, for example indium tin oxide (ITO).

A thin film transistor 25 is provided at an intersection of the gate bus line 21 and the data bus line 22. The thin film transistor 25 acts as a switching means for transmitting a signal of the data bus line 22 to the pixel electrode 24 when the gate bus line 21 is selected.

A common signal line 26 is disposed in contact with a selected portion of the counter electrode 23 and in parallel to the gate bus line 21. Herein, the common signal line 26 transmits a common signal to each counter electrode 23 and is made of an opaque metal having a high conductivity so that there may not arise any signal delay.

A homogeneous alignment layer (not shown) is coated on a resultant of a lower substrate 20. The alignment layer is rubbed in the x direction (or in the y direction). The reference numeral 27 stands for the direction of rubbing axis.

An upper substrate (not shown) is disposed to be spaced apart from the lower substrate 20, and a liquid crystal layer (not shown) is interposed between the upper and lower substrates. Herein, the cell gap between both substrates is set below 6 μm.

As described in the first embodiment, type of the dielectric anisotropy of liquid crystal molecules is determined depending on the direction of electric field. The electrodes are arranged such that the angle between the electric field and the x direction is set below 45°, therefore liquid crystal of a negative dielectric anisotropy is used in the present embodiment.

Another homogeneous alignment layer (not shown) is formed at an inner surface of the upper substrate, hereinafter the alignment layer in the upper substrate is referred to as an upper alignment layer. The upper alignment layer has a rubbing axis which is disposed anti-parallel to the alignment layer in the lower substrate, hereinafter a lower alignment layer.

A polarizer (not shown) is arranged to an outer surface of the lower substrate 20 and an analyzer (not shown) is arranged to an outer surface of the upper substrate. Herein, a polarizing axis of the polarizer is coincided with a rubbing axis of the lower alignment layer and a polarizing axis of the analyzer is disposed perpendicular to a polarizing axis of the polarizer.

Operation of the liquid crystal display constituted as above is given below.

Under the absence of electric field between the counter electrode 23 and the pixel electrode 24, long axes of the liquid crystal molecules are arranged along the ribbing axis uniformly. Then, an incident light to pass the liquid crystal layer (not shown) does not change its polarizing state. Accordingly, the light can not pass the analyzer having a polarizing axis which is disposed by crossing the polarizing axis of the polarizer. A screen has a dark state.

On the other hand, if there is a voltage difference between the counter electrode 23 and the pixel electrode 24, electric fields E1,E2 are formed between the branch 23b of the counter electrode 23 and the second electrode 24b of the pixel electrode 24. At this time, the electric fields E1,E2 are formed in the form of normal lines to the extended direction of the branch 23b and the second electrode 24b in corresponding sub-pixel regions. That is to say, the electric field E1 has an angle θ1+90° with the x direction and is disposed in the sub-pixels R,B, and the electric field E2 has an angle θ1 with the x direction and is disposed in the sub-pixel G. Accordingly, the electric fields in the sub-pixels R and G make a symmetry with respect to the y direction and the electric fields in the sub-pixels G and B make also a symmetry with respect to the y direction. And then, the liquid crystal molecules in the sub-pixels R,B are aligned in a counter-clockwise direction, and the liquid crystal molecules in the sub-pixel G are aligned in a clockwise direction. At this time, their short axes are twisted parallel to the electric field, and the liquid crystal molecules have 45° with the polarizing axis of the polarizer thereby obtaining the maximum transmittance and leaking the light. The screen has a white state.

In aspect of each sub-pixel, the liquid crystal molecules are aligned in one direction uniformly, however, human eyes do not recognize sub-pixels. Therefore, the liquid crystal molecules are twisted in different directions, in aspect of main pixels. Accordingly, the refractive anisotropy of the liquid crystal molecules is compensated and color shift is prevented when a viewer sees the screen in lateral azimuth directions.

Further, both counter electrode 23 and the pixel electrode 24 are made of a transparent metal thereby forming fringe field. The liquid crystal display in the present embodiment has a remarkably improved transmittance rather than the conventional IPS mode liquid crystal display.

The distance between the branch 23b of the counter electrode 23 and the second electrode 24b of the pixel electrode 24 where the electric fields are substantially formed, is smaller than widths of the electrodes 23b, 24b and the widths of the electrodes 23b, 24b are determined so that the liquid crystal molecules overlying the branch 23b of the counter electrode 23 and the second electrode 24b of the pixel electrode 24 are sufficiently aligned by the electric fields E1,E2. The transmittance is also increase.

[Third Embodiment]

Figure 5:
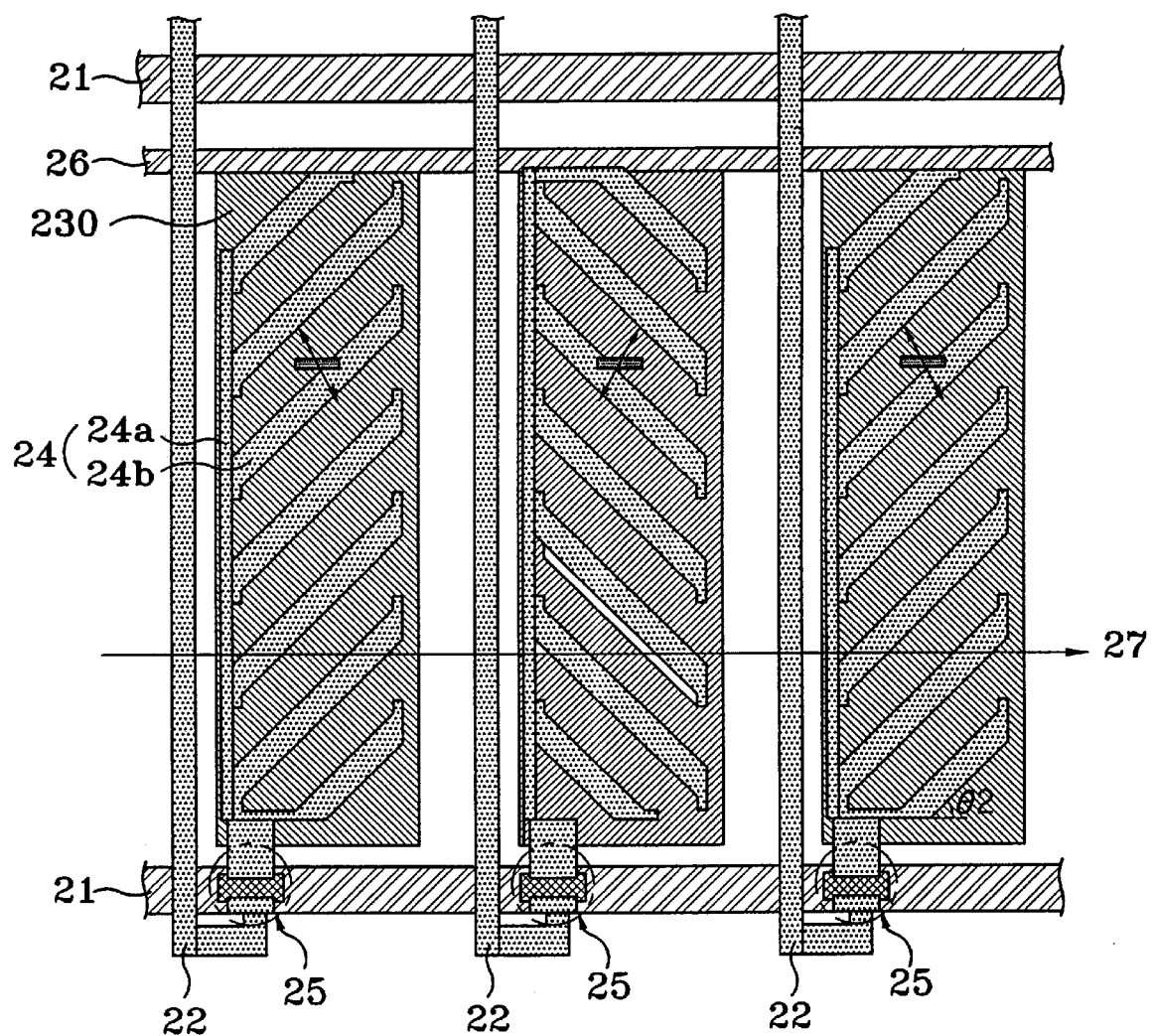
FIG. 5 is a plan view of a lower substrate in an active matrix type liquid crystal display according to a third embodiment of the present invention.

FIG. 5 is a plan view of a lower substrate in an active matrix type liquid crystal display according to a third embodiment of the present invention.

Gate bus lines, data bus lines, thin film transistor, common signal line, first and second alignment layers and first and second polarizers of the present embodiment has the same arrangement with the first embodiment. However, the arrangement of counter and pixel electrodes is different from the first embodiment.

That means, as shown in FIG. 5, the counter electrode 230 of the present embodiment has a plate shape and made of a transparent conductor, for instance ITO metal film.

The pixel electrode 24 is overlapped on the counter electrode 230. The pixel electrode 24, as described in the second embodiment, includes a first electrode 24a being overlapped with a selected peripheral portion of the counter electrode 230 and a second electrode 24b being extended from the first electrode 24a in the form of diagonal lines. Herein, the second electrode 24b is disposed with a regular distance, for example 1~4 μm. The second electrode 24b has an angle θ2, for example 2~30° with the x direction. Accordingly, a liquid crystal layer (not shown) has a negative dielectric anisotropy.

In the present embodiment, the distance between the counter electrode 230 and the pixel electrode 24 is equal to a thickness of a gate insulating layer (not shown), and the thickness of the gate insulating layer is smaller than the widths of both electrodes.

Furthermore, the electric field is formed between the second electrode 24b of the pixel electrode 24 and a selected portion of the counter electrode 230 which is exposed by the second electrode 24b of the pixel electrode 24.

The same operation as in the second embodiment is applied to the liquid crystal display of the present embodiment.

As described above in detail, according to the present invention, an electric field formed in a sub-pixel and another electric field formed in adjacent sub-pixels are in the form of diagonal lines and they are disposed to make a symmetry. Accordingly, under the presence of electric field, the liquid crystal molecules are twisted in two symmetric directions. Therefore, the refractive anisotropy of the liquid crystal molecules is compensated and color shift is prevented. The picture quality is improved.

Furthermore, since counter and pixel electrodes are made of transparent materials and the distance of both electrodes is smaller than the widths of the respective electrodes, the electric fields affect the liquid crystal molecules on the upper portions of the electrodes. Therefore, the transmittance and aperture ratio of the liquid crystal display are greatly improved.

Also, in general, a contrast distribution is improved, in general, in a rubbing direction. The rubbing direction in the present invention is at 90° or 180° which is coincided with the user's viewing direction. That mean, the contrast in the viewer's direction is remarkably improved.

Various other modifications will be apparent to and can be readily made by those skilled in the art without departing from the scope and spirit of the present invention.

What is claimed is:

1. A liquid crystal display having high transmittance and high aperture ratio comprising:

an upper and a lower substrate opposed to be spaced apart;

a liquid crystal layer interposed between inner surfaces of the upper and lower substrates, the liquid crystal layer including a plurality of liquid crystal molecules;

a gate bus line and a data bus line formed in the lower substrate in a matrix configuration and defining sub-pixel regions;

a counter electrode including a body of a rectangular frame shape formed at each sub-pixel region and at least a diagonal branch dividing a region surrounded by the body;

a pixel electrode including a first electrode which is formed to be overlapped with a selected portion of the body of the counter electrode, and second electrodes being extended from the first electrode and disposed parallel to diagonal branches being formed at their corresponding sub-pixels;

a thin film transistor formed at an intersection of the gate bus line and the data bus line, and switching a signal transmitted from the data bus line into the pixel electrode when the gate bus line is selected; and a homogeneous alignment layer formed on inner surfaces of the upper and lower substrates, wherein the diagonal branches and the second electrodes at a selected sub-pixel region are extended as diagonal lines with respect to the gate bus line and the data bus line, wherein other diagonal branches and second electrodes at other sub-pixel regions adjoining in all directions to said selected sub-pixel region are arranged to make a symmetry together with the diagonal branches and the second electrodes of the selected sub-pixel region, wherein the counter and pixel electrodes are made of a transparent conductor, and widths of the diagonal branches of the counter electrode and the second electrodes of the pixel electrodes are properly set so that the electric field being generated between the counter and pixel electrodes being affected by the electrodes entirely.

2. The liquid crystal display of claim 1, wherein a distance between the diagonal branches and the second electrodes is smaller than widths of both electrodes.

3. The liquid crystal display of claim 1, wherein the homogeneous alignment layer in the lower substrate is rubbed in a direction which is parallel to the gate bus line or the data bus line, and the homogeneous alignment layer in the upper substrate is rubbed in a direction which is anti-parallel to the homogeneous alignment layer on the lower substrate.

4. The liquid crystal display of claim 1, further comprising a polarizer on an outer surface of the lower substrate and an analyzer on an outer surface of the upper substrate, wherein a polarizing axis of the polarizer is coincided with a rubbing axis of the homogeneous alignment layer in the lower substrate, wherein the polarizing axis of the analyzer is perpendicular to the polarizing axis of the polarizer.

5. The liquid crystal display of claim 1, wherein in case an angle between an electric field being formed between said diagonal branch of the counter electrode and said second electrode of the pixel electrode and a polarizing axis is in the range of 45~90°, a material of positive dielectric anisotropy is used, and in case said angle is in the range of 0~45°, a material of negative dielectric anisotropy is used for liquid crystal.

* * * * *